(12) United States Patent
Abe et al.

(10) Patent No.: US 6,357,569 B1
(45) Date of Patent: Mar. 19, 2002

(54) TORQUE CONVERTER EQUIPPED WITH LOCK-UP MECHANISM

(75) Inventors: Hiroya Abe; Tetsurou Maruyama, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,559

(22) Filed: Aug. 24, 2000

(30) Foreign Application Priority Data

Aug. 26, 1999 (JP) .......................................... 11-239789
Jul. 18, 2000 (JP) ....................................... 2000-216916

(51) Int. Cl.[7] .............................................. F16H 61/14
(52) U.S. Cl. ...................................... 192/3.29; 192/3.3
(58) Field of Search ............................... 192/3.28, 3.29, 192/3.3

(56) References Cited

FOREIGN PATENT DOCUMENTS

| JP | 05-126231 | 5/1993 |
|---|---|---|
| JP | 05-32687 | 8/1993 |
| JP | 08-105537 | 4/1996 |

*Primary Examiner*—Charles A. Marmor
*Assistant Examiner*—Saúl Rodriguez
(74) *Attorney, Agent, or Firm*—Armstrong, Westerman & Hattori, LLP (57) ABSTRACT

A torque converter TC is constituted having an impeller 11, a turbine 12, a stator 13, a converter cover 11a, which covers the back side of the turbine, and is connected to the impeller, and a lock-up mechanism, which couples and uncouples the impeller and turbine. The lock-up mechanism comprises a lock-up piston 15, which is arranged by being linked to the turbine inside a space enclosed by the converter cover 11a, and lock-up is performed by the lock-up piston mating under pressure to the inner surface of the converter cover due to oil pressure inside a lock-up fastening chamber 17, which is enclosed by the lock-up piston and the back side of the turbine in a space enclosed by the converter cover. In the outer shell 12b of the turbine 12, there are formed a deceleration communication-hole 18, and a slow acceleration communication-hole 19, which open facing flows of hydraulic fluid generated inside the turbine at the time of deceleration and slow acceleration, and link together the inside of the turbine and the lock-up fastening chamber.

6 Claims, 9 Drawing Sheets

TORQUE CONVERTER EQUIPPED WITH LOCK-UP MECHANISM

FIELD OF THE INVENTION

The present invention relates to a torque converter, which is used in an automobile transmission, and more particularly, to a lock-up mechanism-equipped torque converter having a lock-up mechanism, which can couple/uncouple an impeller and a turbine.

BACKGROUND OF THE INVENTION

A torque converter is used in the automatic transmission of an automobile, and a lock-up clutch, which directly connects an impeller and a turbine, is often mounted to a torque converter. Engagement of the lock-up clutch heightens the mechanical efficiency of power transmission and improves gas mileage. Such a lock-up clutch mechanism is constituted by arranging a turbine-coupled lock-up piston (piston member) inside the space on the inner side of a converter cover (cover member), which covers a turbine, and links an engine output axis and impeller. In a lock-up clutch mechanism constituted in this manner, hydraulic pressure builds up inside a lock-up space enclosed by a lock-up piston and back face of a turbine in a space on the inner side of a converter cover, and the lock-up piston mates under pressure with the inner surface of the converter cover, an impeller and turbine are directly connected, and lock-up occurs.

However, it is known that the operating characteristics of such a lock-up mechanism change under the influence of torque converter internal pressure. For example, in a torque converter of a type in which a turbine blade is inserted into a slit formed in the turbine shell, bent up and fastened, because hydraulic fluid from inside the torque converter flows into the inside of the lock-up space through a crack in the slit, lock-up operating characteristics at deceleration are enhanced compared to a torque converter that does not have such a crack (for example, a torque converter of a type in which a turbine blade is soldered to the turbine shell). This is believed to occur because converter internal pressure rises at deceleration, causing hydraulic fluid to flow into the inside of the lock-up space via the above-mentioned crack, increasing the pressing force of the lock-up piston.

For this reason, a torque converter in which a communication-hole was formed in the turbine shell of a soldered-type torque converter was devised and put to practical use. However, the problem is that, when a communication-hole is formed in this manner, turbine internal pressure becomes lower than lock-up space internal pressure during slow acceleration, conversely causing lock-up operating characteristics to deteriorate.

Consequently, it has been proposed in Japanese Patent Laid-open No. H5-126231, and Japanese Patent Laid-open No. H8-105537, for example, that, in addition to forming a communication-hole that passes through the turbine shell into the lock-up space, there be provided a uni-directional valve (also called a check valve, or one-way valve) mechanism, which allows the flow of hydraulic fluid to the lock-up space side from the turbine side via this communication-hole, but prevents reverse flow. Further, in Japanese Patent Utility Model Publication No. H5-32687, it is proposed that, in addition to forming a communication-hole that passes through the turbine shell to the lock-up space, the part that forms this communication-hole be cut so that it is raised up on the inner side of the turbine, and is constituted so as to guide the flow generated inside the turbine at deceleration into the inside of the lock-up space.

However, a problem is that in order to configure a uni-directional valve mechanism, that many more extra parts are required in the turbine, thus raising costs, and another problem is that a torque converter turbine is operated at high speed, and under high pressure, and the operating characteristics, strength, durability, and reliability of a uni-directional valve mechanism are low. Further, in a constitution in which the part that forms a communication-hole is cut so that it is raised up on the inner side of the turbine, this raised part will function to a certain extent as a guide, which leads the flow of oil generated inside the turbine during deceleration into the inside of the lock-up space, but there is the danger that this function is weak, and instead, becomes the cause of flow disturbance, causing torque converter characteristics to deteriorate. Another problem is that there is the danger that the flow that occurs in the opposite direction from that at deceleration, like the flow of oil during slow acceleration, will also be disturbed, causing torque converter characteristics to deteriorate.

SUMMARY OF THE INVENTION

With the foregoing problems in view, it is an object of the present invention to provide a lock-up mechanism-equipped torque converter, which is a simple constitution that does not require extra parts, and which has a structure such that the operability of the lock-up mechanism can be improved as much as possible.

In the present invention, there is constituted a lock-up mechanism-equipped torque converter having an impeller member, which is coupled to an engine output shaft, a turbine member, which is coupled to a transmission input shaft, a stator member, which is maintained in a fixed state, a cover member, which covers the back side of the turbine member, and is connected to the impeller member (for example, converter cover 11a), and a lock-up mechanism, which causes the impeller member and turbine member to couple and uncouple. And the lock-up mechanism is constituted such that it is arranged inside a space enclosed by the cover member, and faces the inner surface of the cover member, and in addition, comprises a piston member (for example, lock-up piston 15), which is coupled to the turbine member, and lock-up is performed when hydraulic force builds up inside a lock-up space (for example, lock-up fastening chamber 17), which is enclosed by the piston member and back face of the turbine member in a space enclosed by the cover member, and the piston member is made to mate under pressure with the inner surface of the cover member.

In addition, there is formed in the turbine member a communication-hole, which opens facing a flow of hydraulic fluid generated inside the turbine in a predetermined direction, and, by connecting the inside of the turbine to the lock-up space, guides the predetermined direction flow into the inside of the lock-up space. Furthermore, this communication-hole is formed such that, for a hydraulic fluid flow that is the reverse of the predetermined direction flow, this reverse flow is disturbed only slightly by the communication-hole, and this reverse flow is restrained from moving inside the lock-up space via the communication-hole.

In a torque converter with a constitution such as this, because the communication-hole formed in the turbine member opens facing a flow of hydraulic fluid of a predetermined direction, hydraulic fluid inside the turbine is efficiently guided into the inside of the lock-up space from this opening, and the operating characteristics of the lock-up clutch improve in a state in which this predetermined direction flow is generated. Furthermore, because the communication-hole is formed such that a flow in the opposite direction thereto is not disturbed, and this reverse direction flow is restrained from moving into the inside of the lock-up space, there is no danger of lock-up clutch operating characteristics deteriorating by the inflow of hydraulic fluid into the inside of the lock-up space in a state in which this opposite direction flow is generated.

In a torque converter of the present invention, it is desirable that the above-mentioned communication-hole be formed such that it opens facing the flow of hydraulic fluid generated inside the turbine in the deceleration side direction at deceleration, and guides the deceleration side direction flow to the inside of the lock-up space, and, in addition, does not disturb a hydraulic fluid flow of opposite the deceleration side direction flow, and restrains this reverse direction flow from moving toward the inside of the lock-up space via the communication-hole.

In a torque converter of such a constitution, because the communication-hole (deceleration communication-hole) formed in the turbine member opens facing the flow of hydraulic fluid at deceleration, hydraulic fluid inside the turbine is efficiently guided into the inside of the lock-up space from this opening, and the operating characteristics of the lock-up clutch during deceleration improve. Engine braking action must be performed by engaging the lock-up clutch at deceleration, and since lock-up clutch operating characteristics improve like this, engine braking action is achieved quickly and efficiently. Furthermore, at acceleration, a flow opposite the deceleration side direction flow occurs inside the turbine, and because the communication-hole is constituted such that, for this flow, hydraulic fluid is restrained from moving toward the inside of the lock-up space via the above-mentioned opening, there is no danger of losing torque converter characteristics at acceleration.

It is desirable for the opening of the above-mentioned communication-hole (deceleration communication-hole) to be provided within a scope that extends from the radial inner diameter side bottom portion of the inner surface of the stator member, toward the outer diameter side, to the critical point of a turbine blade that constitutes the turbine member. Because turbine internal pressure increases at deceleration, and the flow of hydraulic fluid to the inside of the lock-up space from the turbine side is facilitated in this scope, deceleration lock-up all operating characteristics are further improved. Further, this is the scope wherein turbine internal pressure constitutes a relatively low pressure at acceleration, and providing a communication-hole within this scope does not impact the performance of the torque converter much at acceleration. That is, a communication-hole is provided in a scope that does not affect torque converter performance at acceleration. In accordance therewith, the communication-hole does not affect torque converter performance at acceleration, and this communication-hole enhances the operating characteristics of the lock-up clutch at deceleration.

In a torque converter of the present invention, the above-mentioned communication-hole (slow acceleration communication-hole) can be formed such that it opens facing the flow of hydraulic fluid generated inside the turbine in the slow acceleration side direction at slow acceleration, and guides the slow acceleration side direction flow to the inside of the lock-up space, and, in addition, restrains a hydraulic fluid flow of opposite the slow acceleration side direction flow from moving toward the inside of the lock-up space.

In a torque converter of such a constitution, because the communication-hole (slow acceleration communication-hole) formed in the turbine member opens facing the flow of hydraulic fluid at slow acceleration, hydraulic fluid inside the turbine is efficiently guided to the inside of the lock-up space from this opening, and the operating characteristics of the lock-up clutch during slow acceleration improve. Power transmission efficiency must be enhanced by engaging the lock-up clutch at slow acceleration, and since lock-up clutch operating characteristics improve in this manner, lock-up clutch engagement is performed quickly during slow acceleration. Furthermore, at deceleration, a flow opposite the slow acceleration side direction flow occurs inside the turbine, and because the communication-hole is constituted such that, for this flow, hydraulic fluid is restrained from moving toward the inside of the lock-up space via the above-mentioned opening, there is no danger of losing torque converter characteristics at deceleration.

It is desirable for the opening of the above-mentioned communication-hole (slow acceleration communication-hole) to be provided within a scope that extends from the radial outer diameter side end portion of the inner surface of the turbine member, toward the inner diameter side, to the critical point of a turbine blade that constitutes the turbine member. Because turbine internal pressure increases at slow acceleration, and the flow of hydraulic fluid to the inside of the lock-up space from the turbine side is facilitated in this scope, slow acceleration lock-up operating characteristics are further improved. Further, this is the scope wherein turbine internal pressure constitutes a relatively low pressure at deceleration, and providing a communication-hole within this scope does not impact the performance of the torque converter much at deceleration. That is, a communication-hole is provided in a scope that does not affect torque converter performance at deceleration. In accordance therewith, the communication-hole does not affect torque converter performance at deceleration, and this communication-hole enhances the operating characteristics of the lock-up clutch at slow acceleration.

Furthermore, for a torque converter of the present invention, it is desirable that it be constituted from a deceleration communication-hole, which is formed such that the above-mentioned communication-hole opens facing the flow of hydraulic fluid generated inside the turbine in the deceleration side direction at deceleration, and guides the deceleration side direction flow to the inside of the lock-up space, and, in addition, restrains a hydraulic fluid flow of opposite the deceleration side direction flow from moving toward the inside of the lock-up space, and from a slow acceleration communication-hole, which is formed such that it opens facing the flow of hydraulic fluid generated inside the turbine in the slow acceleration side direction at slow acceleration, and guides the slow acceleration side direction flow to the inside of the lock-up space, and, in addition, restrains a hydraulic fluid flow of opposite the slow acceleration side direction flow from moving toward the inside of the lock-up space.

If constituted in this manner, lock-up engagement characteristics can be improved during both deceleration and slow acceleration, and there is no danger of losing torque converter characteristics in either case.

Furthermore, in this case, it is desirable to provide the deceleration communication-hole and slow acceleration communication-hole by positioning them inside different passages in the plurality of passages inside a turbine that are partitioned and formed by turbine blades. In accordance therewith, when both communication-holes are provided inside the same passage, there is the danger that the respective communication-holes will synergistically disturb the flow inside the passage, but by providing them inside different passages, this kind of danger is eliminated, and torque converter performance can be maintained.

The constitution of the present invention is advantageous in that, because it is a simple constitution that provides in the turbine a communication-hole for which the opening direction is specified, manufacturing costs are low, and strength, durability and reliability are high. In addition thereto, it is also advantageous in that lock-up characteristics at deceleration, and lock-up characteristics at slow acceleration can both be enhanced. Further, in the present invention, this communication-hole can either be integrally press molded into the turbine shell itself, or a turbine having a communication-hole and blades can be integrally formed by casting.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
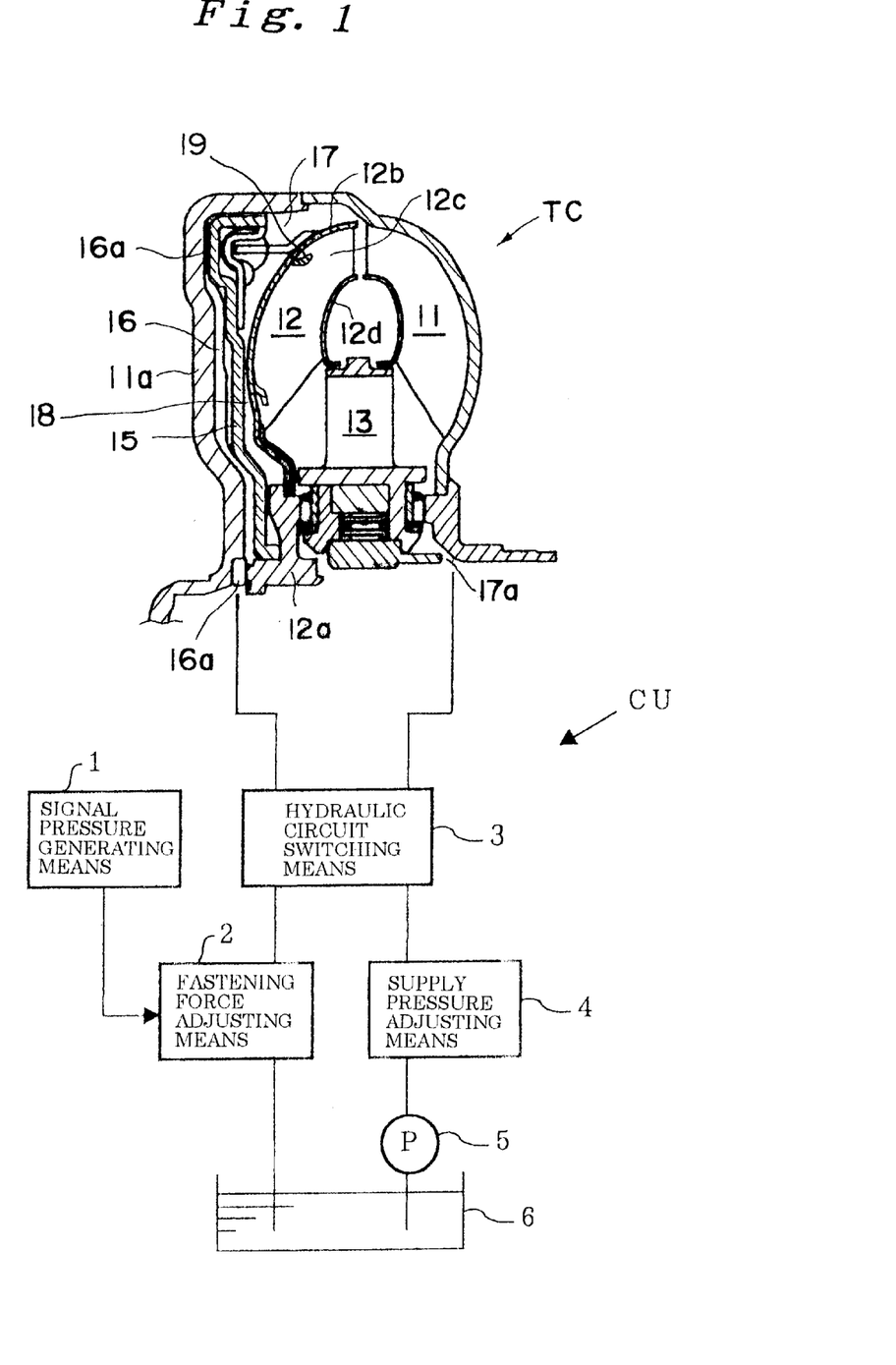
FIG. 1 is a cross-sectional view of a lock-up mechanism-equipped torque converter related to the present invention, and a block diagram showing the constitution of a lock-up control unit.

FIG. 1 shows a lock-up mechanism-equipped torque converter TC related to the present invention. Torque converter TC is constituted from impeller 11, which is coupled to an engine output shaft (not shown in the figure) via converter cover 11a, turbine 12, which is arranged opposite impeller 11, and is coupled to a transmission input shaft (not shown in the figure) via turbine hub 12a, and stator 13, which maintains a fixed state. Lock-up piston 15 is disposed inside a space enclosed by the back face of turbine 12 and the inner surface of converter cover 11a, and constitutes a lock-up mechanism. This space is partitioned into two parts by lock-up piston 15, being divided into lock-up release chamber 16, which is enclosed by converter cover 11a and lock-up piston 15, and lock-up fastening chamber 17, which is enclosed by turbine 12 and lock-up piston 15. Furthermore, this lock-up piston 15 is mounted so as to be movable in the axial direction relative to turbine hub 12a, and to rotate as one with turbine hub 12a.

The inside of torque converter TC is filled with hydraulic fluid, which is supplied from lock-up oil inlet 16a and converter oil inlet 17a, and turbine 12 is rotated and driven by the dynamic pressure of hydraulic fluid generated when impeller 11 is rotated by an engine. Torque from impeller 11 is amplified by the action of the blades of impeller 11, turbine 12, and stator 13 at this time, and transmitted to turbine 12, but because this is fluid-based power transmission, a certain amount of power transmission loss occurs even under operating conditions in which impeller 11 and turbine 12 rotate the same. To hold down such power transmission loss, a lock-up mechanism is provided to mechanically directly couple and integrally rotate impeller 11 and turbine 12 under operating conditions in which both rotate the same.

The lock-up mechanism operates by controlling the hydraulic fluid supplied from lock-up oil inlet 16a and converter oil inlet 17a, and controlling the oil pressure inside lock-up release chamber 16 and lock-up fastening chamber 17. For example, by reducing the oil pressure inside lock-up release chamber 16, the oil pressure inside lock-up fastening chamber 17 causes lock-up piston 15 to press against the inner surface of converter cover 11a, and lock-up piston 15 and converter cover 11a are bonded by friction between clutch friction material 16a, which is provided on the side surface of lock-up piston 15, and the inner surface of converter cover 11a. The result thereof constitutes a lock-up operating state, in which impeller 11 and turbine 12 are coupled, and rotate as one. Contrary thereto, if the oil pressure inside lock-up release chamber 16 is made higher than the oil pressure inside lock-up fastening chamber 17 by supplying hydraulic fluid to lock-up release chamber 16 from lock-up oil inlet 16a, lock-up piston 15 separates from the inner surface of converter cover 11a, a lock-up release state is achieved, and impeller 11 and turbine 12 can rotate independently, constituting a state in which torque converter TC operates.

By controlling the hydraulic fluid supplied from lock-up oil inlet 16a and converter oil inlet 17a in this manner, it is possible to control the contact made between lock-up piston 15 and the inner surface of converter cover 11a, thus causing lock-up to operate, and to release, and even causing partial coupling (this is called lock-up clutch slip control). Lock-up control unit CU is provided to control lock-up in this manner.

Lock-up control unit CU is constituted comprising hydraulic pump 5, which supplies hydraulic fluid stored inside oil tank 6, supply pressure adjusting means 4, which adjusts the supply pressure supplied from hydraulic pump 5, hydraulic circuit switching means 3, which performs control for supplying hydraulic fluid that has been pressure adjusted by supply pressure adjusting means 4 to lock-up oil inlet 16a and converter oil inlet 17a, fastening force adjusting means 2, which controls the pressure of the hydraulic fluid supplied to lock-up release chamber 16 from lock-up oil inlet 16a, and signal pressure generating means 1, which supplies signal pressure that controls the operation of fastening force adjusting means 2. According to a lock-up control unit CU of this constitution, the oil pressure inside lock-up release chamber 16 is adjusted and controlled by fastening force adjusting means 2, the oil pressure inside lock-up fastening chamber 17 is adjusted and controlled by supply pressure adjusting means 4, and lock-up clutch coupling operation control is performed by switching and controlling supply oil pressure using hydraulic circuit switching means 3.

Figure 2:
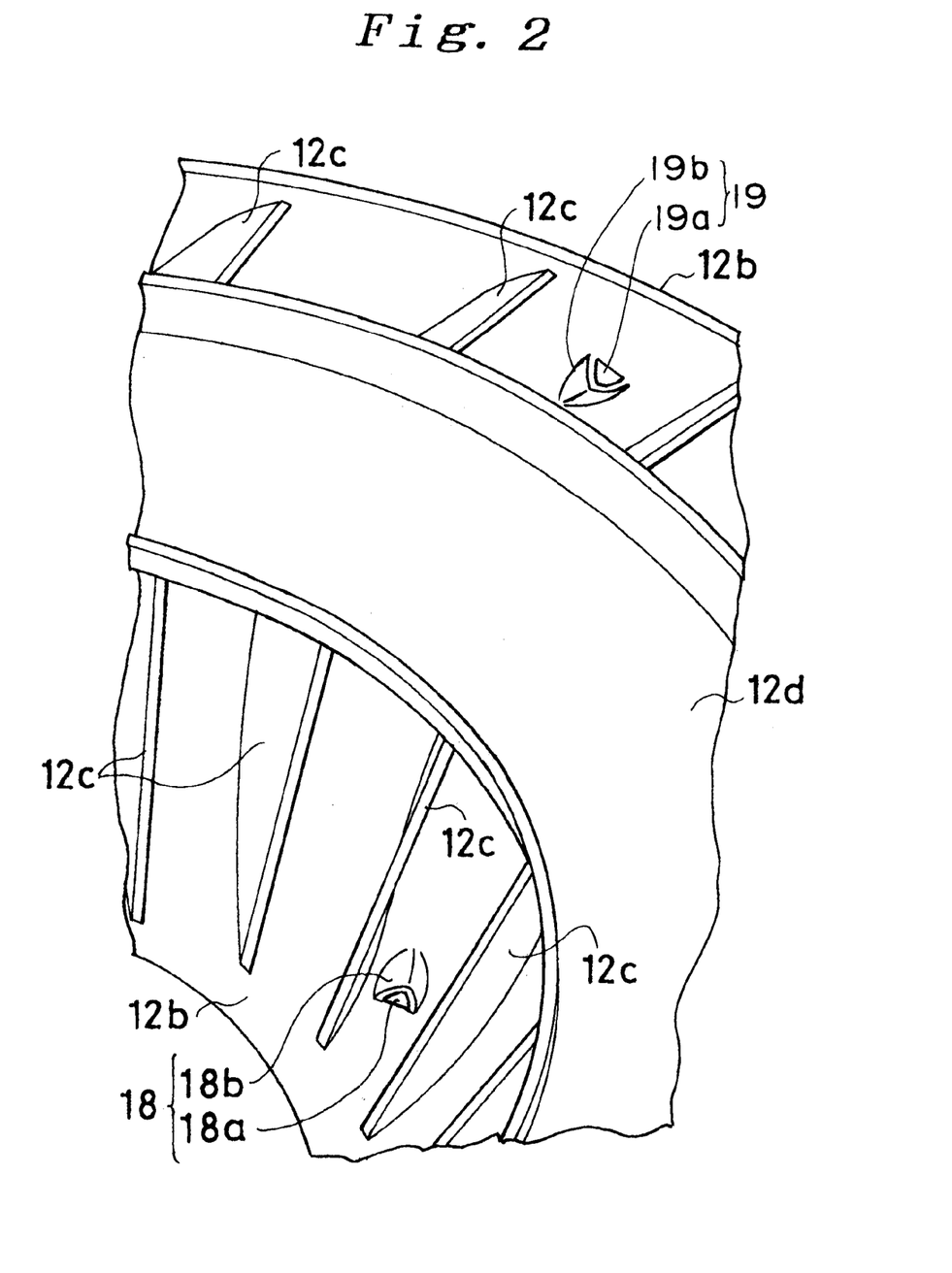
FIG. 2 is a partial oblique view showing the shape of a turbine that constitutes the above-mentioned torque converter.

In a torque converter TC equipped with a lock-up clutch constituted as described hereinabove, to improve the coupling characteristics of the lock-up clutch, there is provided a deceleration communication-hole 18 and a slow acceleration communication-hole 19, which pass through outer shell 12b of turbine 12, and link the torque converter internal space to lock-up fastening chamber 17. The shape of the inside of turbine 12 is shown in FIG. 2, and, as can be discerned from this figure, turbine 12 is constituted by providing a plurality of turbine blades 12c between outer shell 12b and inner shell 12d. Here, turbine blades 12c are mounted by soldering.

Deceleration communication-hole 18 is located between turbine blades 12c on the inner diameter side, and is integrated with outer shell 12b by press molding. Further, slow acceleration communication-hole 19 is located between turbine blades 12c on the outer diameter side, and is integrated with outer shell 12b by press molding. Furthermore, here deceleration communication-hole 18 and slow acceleration communication-hole 19 are formed in different passages of the plurality of passages interposed between turbine blades 12c in turbine 12, but both communication-holes 18, 19 can be formed inside the same passage.

Deceleration communication-hole 18 is press molded with outer shell 12b on the inside, and has a raised portion 18b, and, in addition, has an opening portion 18a, which opens in the direction of the inner diameter. For example, deceleration communication-hole 18 is formed in shapes like those shown in FIG. 4, and the communication-hole is formed from opening portion 18a in the outer surface side of raised portion 18b to lock-up fastening chamber 17. Further, slow acceleration communication-hole 19 is press molded with outer shell 12b on the inside, and has a raised portion 19b, and, in addition, has an opening portion 19a, which opens inward. For example, slow acceleration communication-hole 19 is formed in shapes like those shown in FIG. 4, and the communication-hole is formed from opening portion 19a in the outer surface side of raised portion 19b to lock-up fastening chamber 17.

Figure 3:
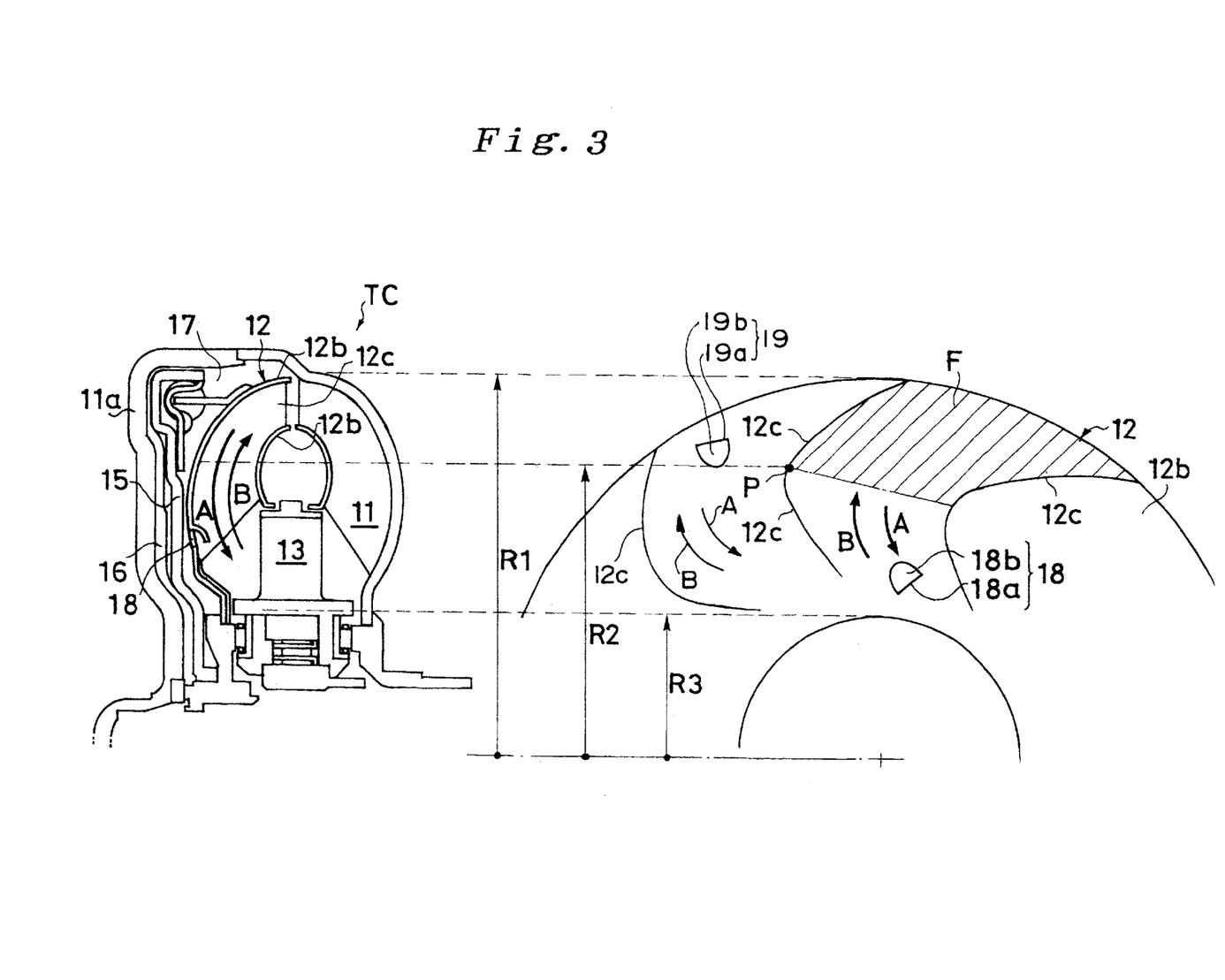
FIG. 3 is a cross-sectional view showing the constitution of the above-mentioned torque converter, and a front schematic diagram showing the simplified shape of the turbine.
Figure 4A:
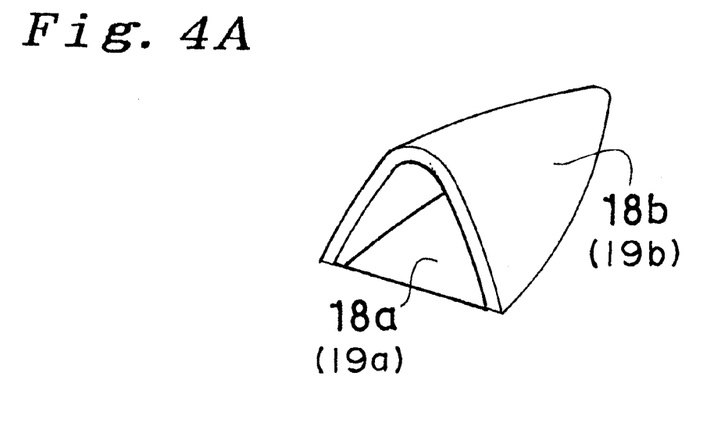
FIG. 4 is oblique views showing examples of shapes of communication-holes formed in the above-mentioned turbine.
Figure 4B:
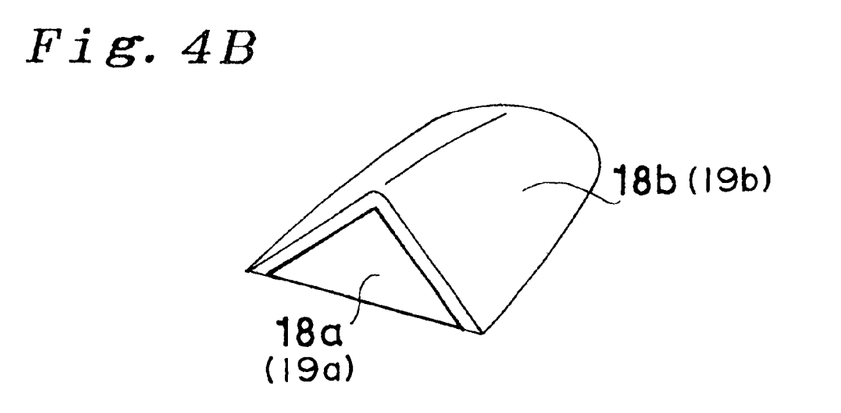
Figure 4C:
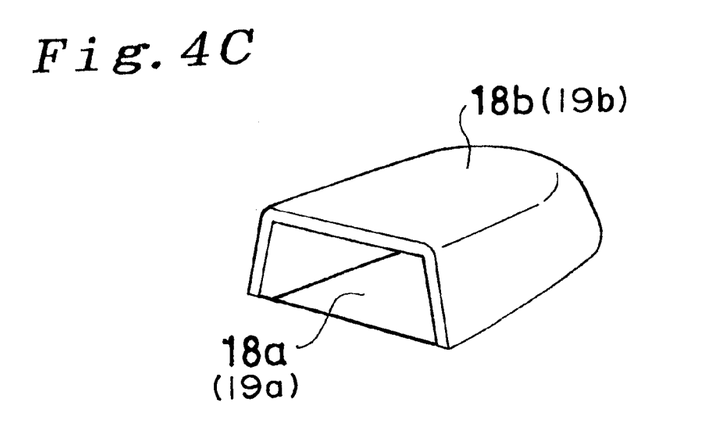

FIG. 3 shows the flow of hydraulic fluid inside torque converter TC and turbine 12. Hydraulic fluid flows in the direction of arrow B at deceleration, and flows in the direction of arrow A at acceleration (including at slow acceleration). Here, opening portion 18a of deceleration communication-hole 18, as shown in the figure, is formed so as to face the arrow B direction flow, which is generated at deceleration, and hydraulic fluid is guided to the inside of opening portion 18a by the flow generated at deceleration, and flows into the inside of lock-up fastening chamber 17. Thus, the operating characteristics of the lock-up clutch are enhanced at deceleration. Relative to a flow like this in the direction of arrow B, opening portion 19a of slow acceleration communication-hole 19 opens downstream, and raised portion 19b, as can be discerned from FIG. 4, is made into a streamlined shape facing downstream. Thus, raised portion 19b does not disturb the flow in the direction of arrow B.

Opening portion 19a of slow acceleration communication-hole 19, as shown in the figure, is formed so as to face the arrow A direction flow, which is generated at slow acceleration, and hydraulic fluid is guided to the inside opening portion 19a by the flow generated at slow acceleration, and flows into the inside of lock-up fastening chamber 17. Thus, the operating characteristics of the lock-up clutch are enhanced at slow acceleration. Relative to a flow like this in the direction of arrow A, opening portion 18a of deceleration communication-hole 18 opens downstream, and raised portion 18b, as can be discerned from FIG. 4, is made into a streamlined shape facing downstream. Thus, raised portion 18b does not disturb the flow in the direction of arrow A.

Here, pressure distribution inside the torque converter at deceleration and slow acceleration will be considered. First, at acceleration, including slow acceleration, internal pressure inside hatching area F, which is an area on the outer diameter side from critical point P of turbine blade 12c inside the turbine, constitutes a higher pressure than the internal pressure inside an area more toward the inside. Conversely, at deceleration, the internal pressure inside hatching area F constitutes lower pressure than the internal pressure of an area more toward the inside. With the foregoing in view, it is desirable to avoid hatching area F, and to provide deceleration communication-hole 18 in an area more toward the inside. Conversely, it is desirable to provide slow acceleration communication-hole 19 inside hatching area F. Furthermore, in FIG. 3, hatching area F is shown only in one passage inside the turbine, but hatching area F is set inside all passages.

Hatching area F is an area inside the turbine on the outer diameter side from critical point P of turbine blades 12c, and is an area from critical point radius R2 to radius R1 of the outermost periphery of a turbine blade. As can be discerned therefrom, deceleration communication-hole 18 is formed inside an area from critical point radius R2 to radius R3 of the bottom portion of the stator, and slow acceleration communication-hole 19 is formed inside an area from critical point radius R2 to radius R1 of the outermost periphery of a turbine blade.

Figure 5:
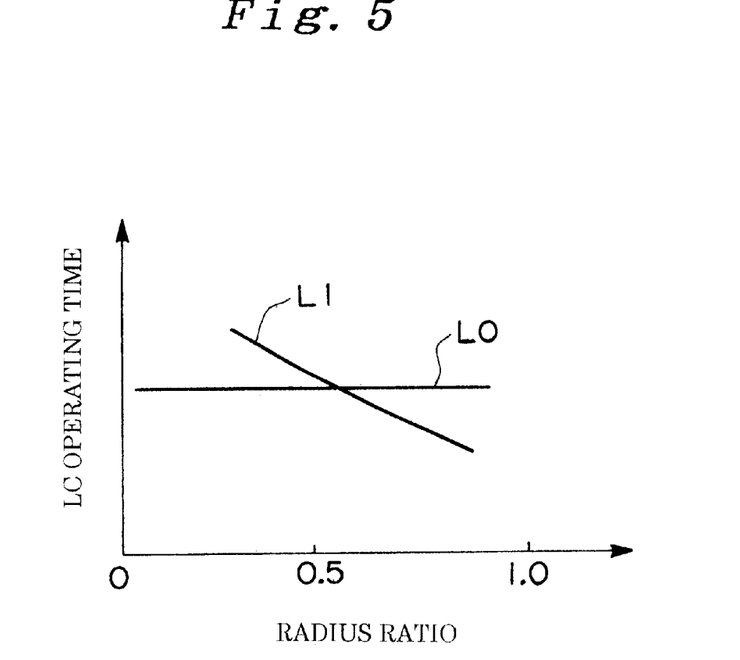
FIG. 5 is a graph showing the relationship between the location of a slow acceleration communication-hole formed in the above-mentioned turbine, and lock-up operating time.

The relationship between the location of the abovementioned communication-holes 18, 19 and lock-up operating characteristics will be explained by referring to FIG. 5 and FIG. 6. In FIG. 5, the location of slow acceleration communication-hole 19 is shown on the horizontal axis as a radius ratio, and lock-up operating time when a slow acceleration communication-hole 19 is formed at each corresponding location is shown on the vertical axis. Line L0 depicts lock-up operating time in a case in which a simple through-hole is formed in the optimum location in a turbine at which lock-up time becomes the shortest, and line L1 depicts lock-up operating time in a case in which slow acceleration communication-hole 19 is formed in a corresponding location. Furthermore, the location indicated by radius ratio 0.0 signifies the innermost diameter location of a turbine blade 12c, 0.5 signifies the center location in the radial direction, and 1.0 signifies the outermost diameter location of a turbine blade 12c.

As can be discerned from FIG. 5, to the extent that slow acceleration communication-hole 19 is provided on the outer diameter side of a turbine, lock-up operating time becomes shorter. And, in accordance with moving the location of slow acceleration communication-hole 19 to the inner diameter side, lock-up operating time becomes longer, becoming the same as in the case of a simple through-hole in the vicinity of radius ratio 0.55, and if this location is more toward the inner diameter side, lock-up operating time becomes longer than in the case of the through-hole. Furthermore, the location of radius ratio 0.55 is in the vicinity of critical point P of turbine blade 12c, and as can be discerned therefrom, it is desirable that slow acceleration communication-hole 19 be formed in hatching area F of FIG. 3. Preferably, slow acceleration communication-hole 19 can be formed in an area between radius ratio 0.55–1.00.

Figure 6:
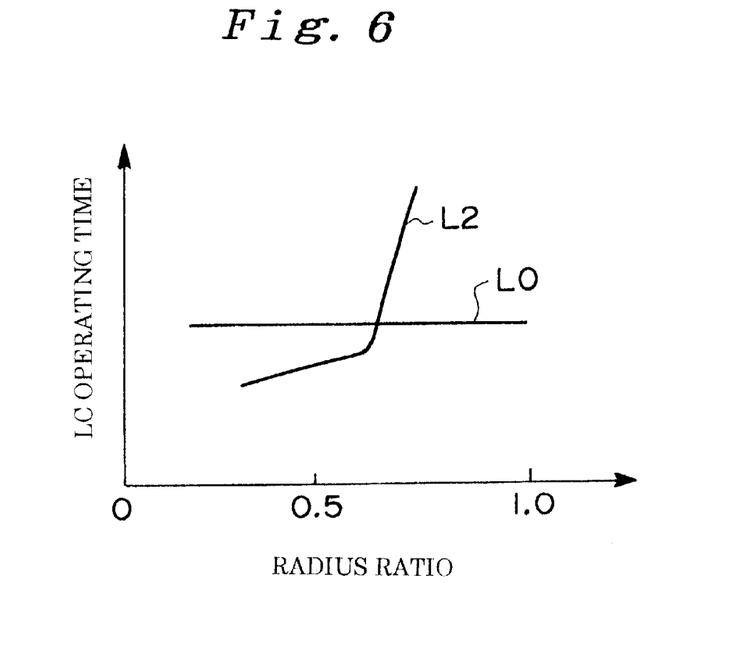
FIG. 6 is a graph showing the relationship between the location of a deceleration communication-hole formed in the above-mentioned turbine, and lock-up operating time.

Conversely, in FIG. 6, the location of deceleration communication-hole 18 is shown on the horizontal axis as a radius ratio, and lock-up operating time when deceleration communication-hole 18 is formed at each corresponding location is shown on the vertical axis. Line L0 depicts lock-up operating time in a case in which a simple through-hole is formed in the optimum location in a turbine at which lock-up time becomes the shortest, and line L2 depicts lock-up operating time in a case in which deceleration communication-hole 18 is formed in a corresponding location.

As can be discerned from FIG. 6, to the extent that deceleration communication-hole 18 is provided on the inner diameter side of a turbine, lock-up operating time becomes shorter. And, in accordance with moving the location of deceleration communication-hole 18 to the outer diameter side, lock-up operating time becomes longer, becoming the same as in the case of a simple through-hole in the vicinity of radius ratio 0.65, and if this location is more toward the outer diameter side, lock-up operating time becomes dramatically longer. The location of radius ratio 0.65 is in the vicinity of critical point P of turbine blade 12c, and as can be discerned therefrom, it is desirable that deceleration communication-hole 18 be formed in an area more toward the inner diameter side than hatching area F of FIG. 3. Preferably, deceleration communication-hole 18 can be formed in an area between radius ratio 0.0–0.65.

Figure 7:
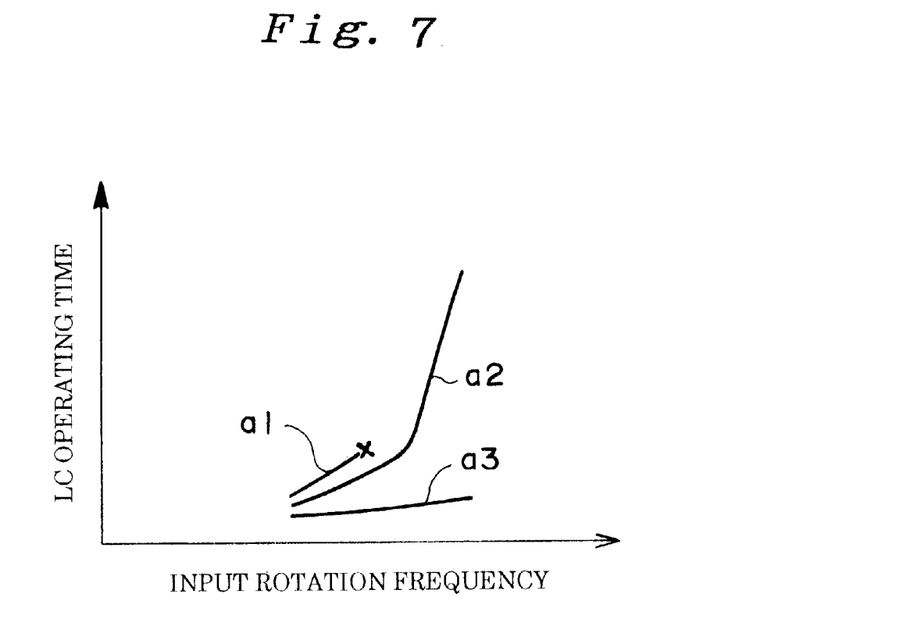
FIG. 7 is a graph showing the relationship between input rotation frequency and lock-up operating time at slow acceleration in cases using a conventional and present invention turbine.
Figure 8:
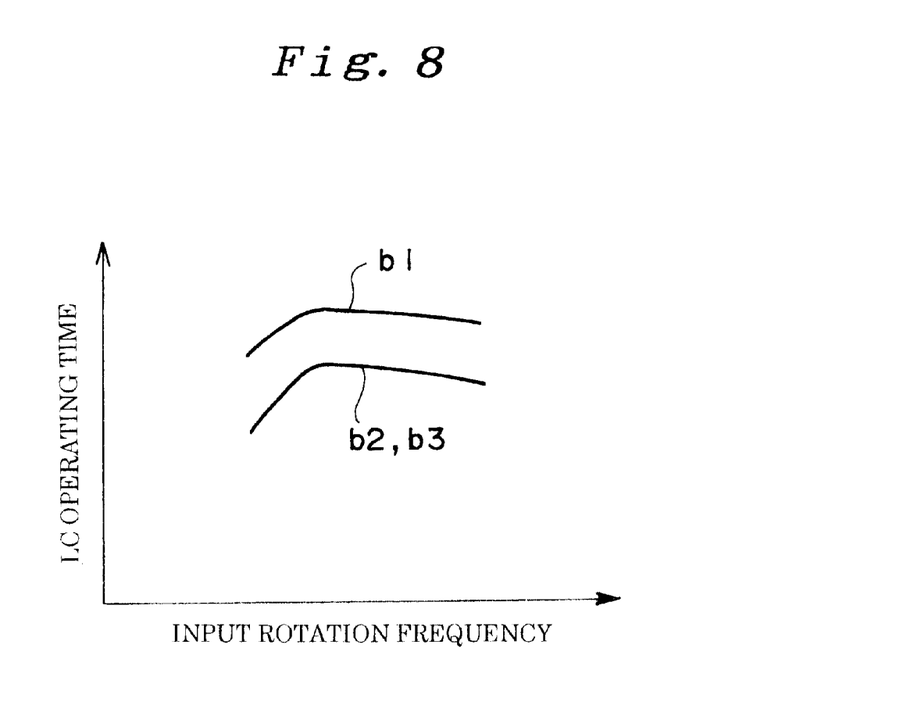
FIG. 8 is a graph showing the relationship between input rotation frequency and lock-up operating time at deceleration in cases using a conventional and present invention turbine.

FIG. 7 and FIG. 8 show the results of experiments on differences in lock-up operating characteristics in cases in which deceleration and slow acceleration communication-holes 18, 19 of shapes like those mentioned above are formed as described hereinabove, and in cases in which a simple through-hole (a flat through-hole without raised portion 18b) was provided in a turbine shell as in the past. FIG. 7 shows lock-up operating characteristics at slow acceleration, and FIG. 8 shows lock-up operating characteristics at deceleration.

In FIG. 7, line a1 depicts characteristics in the case of only a simple through-hole, line a2 depicts characteristics in the case of only deceleration communication-hole 18, and line a3 depicts characteristics in a case in which deceleration communication-hole 18 and slow acceleration communication-hole 19 are both formed. As can be discerned from this figure, in the cases of a simple through-hole or deceleration communication-hole 18 only, lock-up operating time becomes long in an area in which input rotation frequency is great, but in the case in which deceleration communication-hole 18 and slow acceleration communication-hole 19 are both formed, lock-up operating time can be shortened in practically all areas.

Conversely, in FIG. 8, line b1 depicts characteristics in the case of only a simple through-hole, line b2 depicts characteristics in the case of only deceleration communication-hole 18, and line b3 depicts characteristics in a case in which deceleration communication-hole 18 and slow acceleration communication-hole 19 are both formed. As can be discerned from this figure, lock-up operating time can be shortened more in a case of a deceleration communication-hole 18 only, and a case in which deceleration communication-hole 18 and slow acceleration communication-hole 19 are both formed, than in the case of only a simple through-hole.

Figure 9:
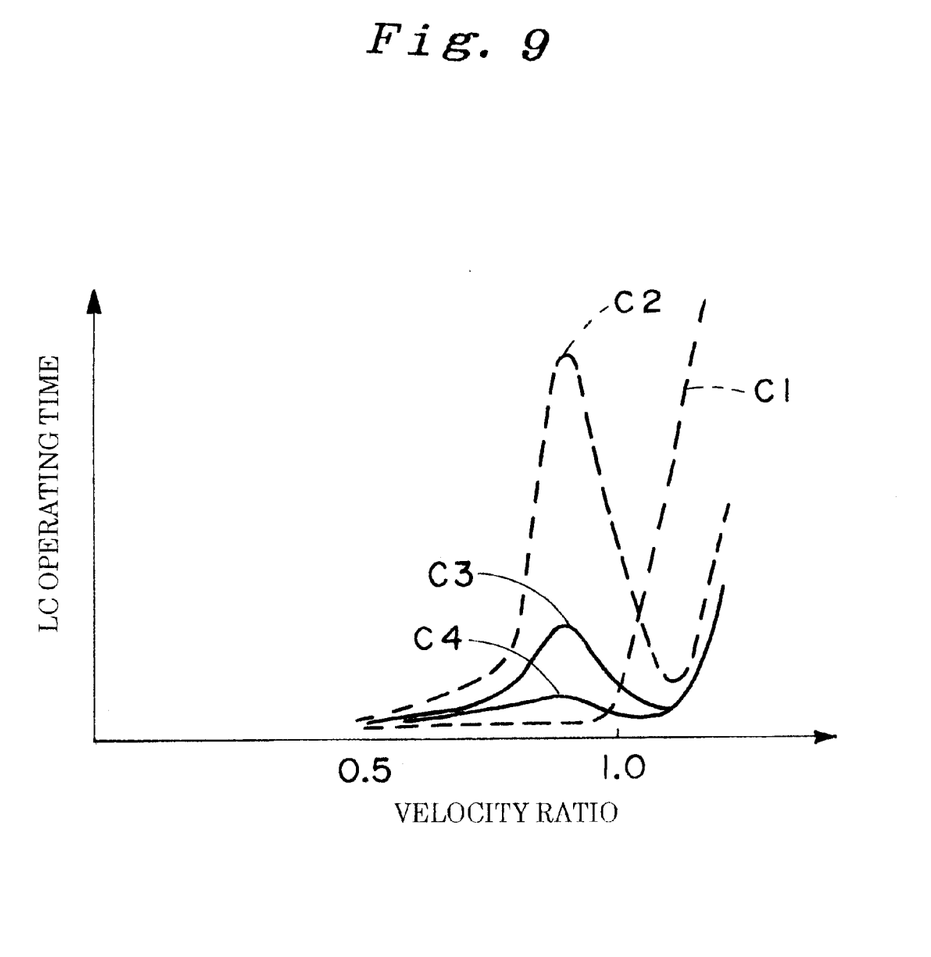
FIG. 9 is a graph showing the relationship between torque converter velocity ratio and lock-up operating time in cases using a conventional and present invention turbine.

Next, FIG. 9 shows the relationship between the velocity ratio of a torque converter and lock-up operating time in a case in which a communication-hole is not provide in the turbine (line c1), a case in which a simple through-hole is provided (line c2), a case in which only deceleration communication-hole 18 is provided (c3), and a case in which deceleration communication-hole 18 and slow acceleration communication-hole 19 are both provided (line c4).

As can be discerned from FIG. 9, in a case in which there is no communication-hole, as indicated by line c1, lock-up operating time is short at deceleration, but lock-up operating time becomes long at slow acceleration. In a case in which only a simple through-hole is formed, as indicated by line c2, lock-up operating time becomes long in the vicinity of velocity ratio 0.9, and lock-up operating time also becomes long in the area in which the velocity ratio constitutes 1.1 or higher.

Conversely, in a case in which only deceleration communication-hole 18 is provided, as indicated by line c3, lock-up operating time is greatly reduced compared to the case having a simple through-hole. However, in the vicinity of velocity ratio 0.9, and in the area of 1.1 or higher, there is a tendency for lock-up operating time to become slightly longer. By contrast thereto, in a case in which deceleration communication-hole 18 and slow acceleration communication-hole 19 are both provided, as indicated by line c4, lock-up operating time is shortened in the vicinity of velocity ratio 0.9, and it is possible to achieve lock-up operating characteristics that are good overall.

In a case in which deceleration communication-hole 18 and slow acceleration communication-hole 19 are both provided, as shown in FIG. 2 and FIG. 3, deceleration communication-hole 18 and slow acceleration communication-hole 19 can be provided separately in different passages of the plurality of passages that are formed by the inside of a turbine being partitioned by turbine blades, and deceleration communication-hole 18 and slow acceleration communication-hole 19 can also be provided inside the same passage. However, in a case in which deceleration communication-hole 18 and slow acceleration communication-hole 19 are provided inside the same passage, the raised portions are apt to disturb the flow, making it desirable that deceleration communication-hole 18 and slow acceleration communication-hole 19 be provided in different passages.

In a case in which deceleration communication-hole 18 and slow acceleration communication-hole 19 are provided inside the same passage, because these communication-holes 18, 19 have raised portions 18b, 19b, fluid loss becomes great due to separation generated when a highspeed oil flow that is flowing inside the passage collides with raised portions 18b, 19b. Thus, there will be a discrepancy in the amount of pressure drop at the turbine outlet portion between a passage in which communication-holes 18, 19 have been set, and a passage in which these communication-holes have not been provided. As a result thereof, turbine outlet portion pressure will vary, and when a passage in which the communication-holes are set, and a passage in which a communication-hole is not set are in proximity, the flow in the outlet portion will be curved from the side in which a communication-hole is not set to the side in which the communication-holes are set. Influenced by such a flow, the flow of oil flowing out from the turbine outlet will be made to flow into the stator at a large angle of incidence, and torque converter transmission efficiency will drop. With the foregoing in view, it is desirable to provide deceleration communication-hole 18 and slow acceleration communication-hole 19, respectively, in different passages in the plurality of passages partitioned and formed inside the turbine by turbine blades.

Figure 10A:
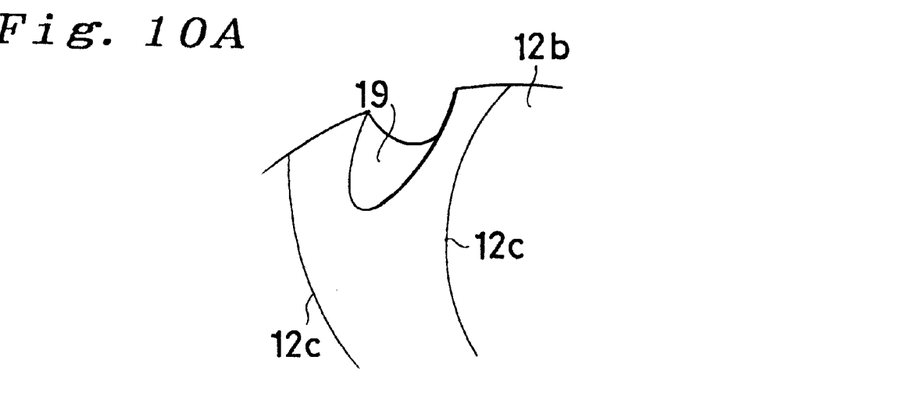
FIG. 10 is oblique views showing examples of shapes of slow acceleration communication-holes formed in a turbine peripheral end portion in a torque converter related to the present invention.
Figure 10B:
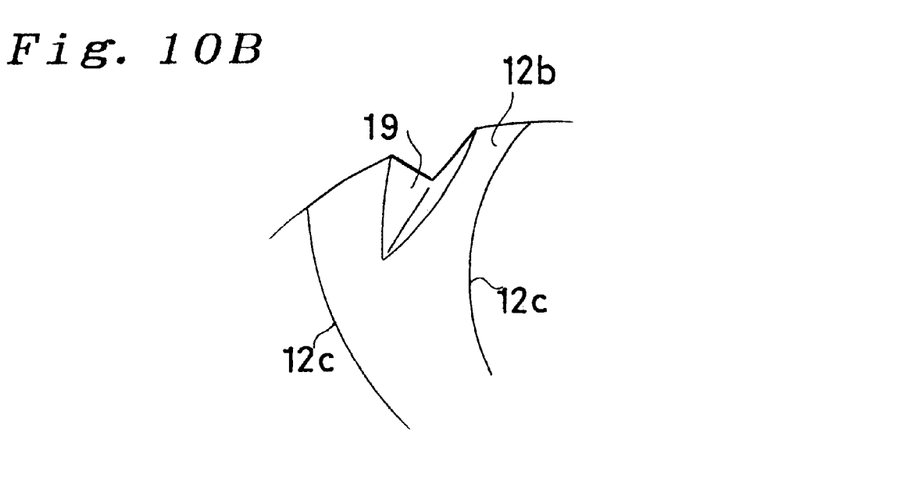
Figure 10C:
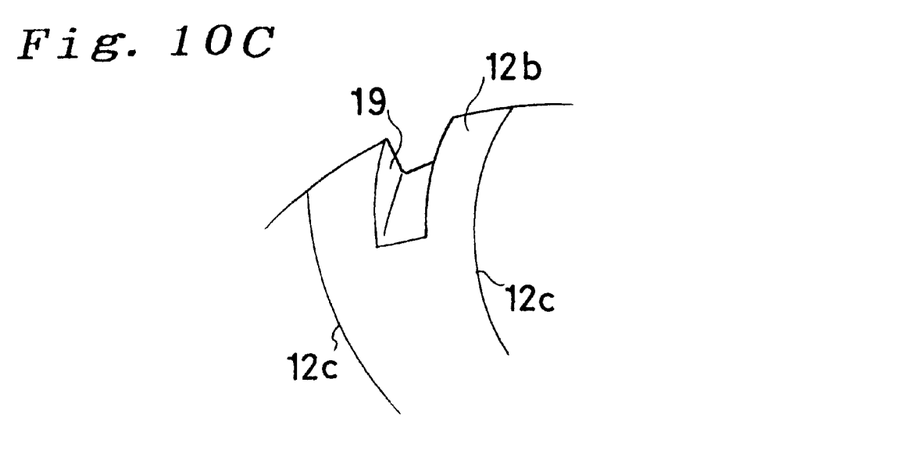

Further, with regard to slow acceleration communication-hole 19, as shown in FIGS. 10A, B, C, slow acceleration communication-hole 19 can be formed by performing bending processing on the peripheral end portion of turbine outer shell 12b.

As described hereinabove, qualitative orientation and location are understood in cases in which deceleration and slow acceleration communication-holes 18, 19 are formed, but when designing an actual torque converter, it is necessary to specify exactly where communication-holes 18, 19 are to be provided. Because lock-up clutch responsiveness changes in accordance with torque converter unit performance, cross-section (torus) shape, torque converter operating state, and hydraulic fluid temperature, these factors must be taken into consideration for the optimum setting locations of communication-holes 18, 19. But the actual testing and confirming of these factors requires an enormous amount of man-hours. For this reason, the optimum setting locations for communication-holes 18, 19 in this example were determined via computations, the method for which will be explained hereinbelow.

According to the inventors' research, it was learned that factors influencing lock-up operating characteristics include, in addition to lock-up hydraulic fluid, the generation of pressure interference, which can change the oil pressure difference of the lock-up release chamber 16 and fastening chamber 17 in accordance with the quantity of pressure generated on the inner surface of the turbine shell. Because the pressing force (thrust) of lock-up piston 15 increases and decrease in accordance with this pressure interference, operating delays occur. Accordingly, there was devised a computation method, such as that described hereinbelow, which makes it possible to predict a lock-up clutch operating delay by expressing as a numerical value the pressing force of the release side, which acts on lock-up piston 15 in this manner.

In this computation method, to express the release side pressing force of the lock-up piston as a numerical value, computational fluid dynamics software is used, and by solving for the Navier-Stokes equation in a rotating coordinate system, pressure distribution on the lock-up fastening chamber and release chamber is directly computed, and the pressing force (axial thrust) generated in each portion of a lock-up clutch mechanism is calculated. Computation methods for predicting torque converter characteristics using computational fluid dynamics software have existed for some time, but because these methods only target the impeller, turbine, and stator for calculation, and treat the overall torque converter as a rotating closed space, it was not possible to calculate the release side pressing force of a lock-up piston.

Figure 11:
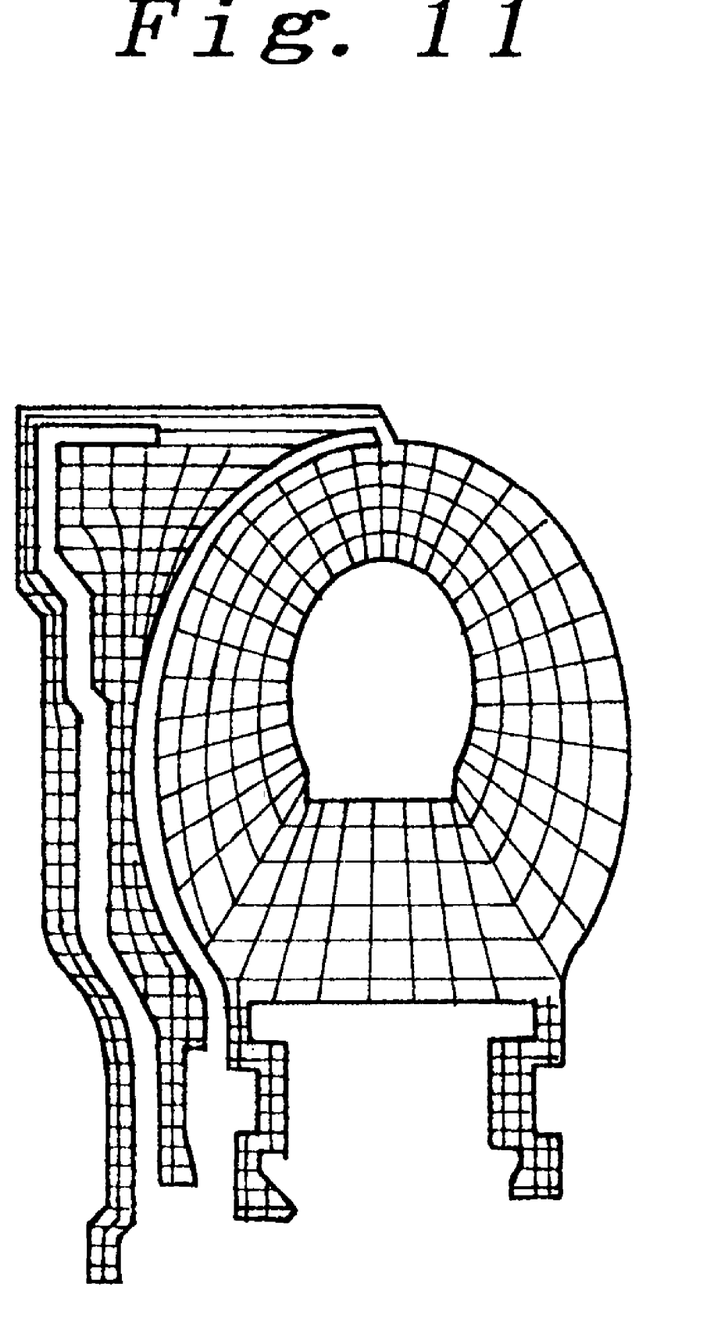
FIG. 11 is an illustration showing an example of a mesh for lock-up clutch thrust computations.

In this computation method, as shown in FIG. 11, the "setting up of a computational mesh comprising the lock-up clutch periphery, and hydraulic fluid inflow/outflow portions" is performed, and, in addition, "the addition of hydraulic fluid inflow/outflow conditions" is carried out, making it possible to calculate the release side pressing force of a lock-up piston. As shown in FIG. 11, in this example, in order to shorten computation time, one blade's worth of space for the impeller, turbine and stator blades targeted for computation is converted to mesh, but computations can also be performed by converting the entire space inside a torque converter to mesh. Further, in this example, a standard $\kappa$-$\epsilon$ model was used in the turbulence model, and the SIMPLE method was used as the analysis algorithm, but when required computational accuracy and convergence are taken into consideration, other models can also be selected.

As the computation procedure, after preparing a computational mesh reflecting the shape of communication-holes to be set, and various data (for example, setting diameter, quantity, through-hole area, and so forth), the results of computing the pressure distribution in the lock-up clutch periphery are used, and pressing force is determined. Using this computation method makes it possible to compute respective lock-up clutch release side pressing forces corresponding to differences in torque converter unit performance, cross-sectional (torus) shape, torque converter operating state, and hydraulic fluid temperature for the shape and data of communication-holes to be set, thus enabling the setting of a communication-hole location, shape, and data that make it possible to achieve targeted lock-up operating responsiveness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Applications No. 11-239789 filed on Aug. 26, 1999 and No. 2000-216916 filed on Jul. 18, 2000, which are incorporated herein by reference.

What is claimed is:

1. A lock-up mechanism-equipped torque converter having an impeller member, which is coupled to an engine output shaft, a turbine member, which is coupled to a transmission input shaft, a stator member, which remains fixed, a cover member, which covers the back surface side of side turbine member, and is connected to said impeller member, and a lock-up mechanism, which causes said impeller member and said turbine member to couple and uncouple, wherein said lock-up mechanism is disposed inside a space enclosed by said cover member and faces the inner surface of said cover member, and, in addition, comprises a piston member, which is coupled to said turbine member, and lock-up is performed by oil pressure building up inside a lock-up space, which is enclosed by said piston member and the back surface of said turbine member in a space enclosed by said cover member, and said piston member being made to mate under pressure with the inner surface of said cover member, wherein in said turbine member, there is formed a communication-hole, which opens facing a flow of hydraulic fluid generated inside said turbine in a predetermined direction, and by linking the inside of said turbine to said lock-up space, guides said predetermined direction flow into the inside of said lock-up space, wherein said communication-hole is shaped such that, for a flow of hydraulic fluid opposite of the predetermined direction flow, said reverse flow is restrained from moving toward the inside of said lock-up space, and wherein said communication-hole is shaped such that said communication-hole opens facing a flow of hydraulic fluid generated inside said turbine in the direction of the deceleration side at the time of deceleration, and guides said deceleration side direction flow to the inside of said lock-up space, and, in addition, restrains a hydraulic fluid flow of opposite said deceleration side flow from moving toward the inside of said lock-up space.

2. The lock-up mechanism-equipped torque converter according to claim 1, wherein said communication-hole is provided within a scope that extends from the radial inner diameter side bottom portion of the inner surface of said stator member, toward the outer diameter side, to the critical point of a turbine blade that constitutes said turbine member.

3. The lock-up mechanism-equipped torque converter according to claim 1, wherein said communication-hole is shaped such that said communication-hole opens facing a flow of hydraulic fluid generated inside said turbine in the direction of the slow acceleration side at the time of slow acceleration, and guides said slow acceleration side direction flow to the inside of said lock-up space, and, in addition, restrains a flow of hydraulic fluid of opposite the slow acceleration side direction flow from moving toward the inside of said lock-up space.

4. The lock-up mechanism-equipped torque converter according to claim 3, wherein said communication-hole is provided within a scope that extends from the radial outer diameter side end portion of the inner surface of said turbine member, toward the inner diameter side, to the critical point of a turbine blade that constitutes said turbine member.

5. The lock-up mechanism-equipped torque converter according to claim 1, wherein said communication-hole comprises:

a deceleration communication-hole, which is shaped such that said deceleration communication-hole opens facing a flow of hydraulic fluid generated inside said turbine in the deceleration side direction at the time of deceleration, and guides said deceleration side direction flow to the inside of said lock-up space, and, in addition, restrains a flow of hydraulic fluid of opposite said deceleration side direction flow from moving toward the inside of said lock-up space; and a slow acceleration communication-hole, which is shaped such that said slow acceleration communication-hole opens facing a flow of hydraulic fluid generated inside said turbine in the slow acceleration side direction at the time of slow acceleration, and guides said slow acceleration side direction flow to the inside of said lock-up space, and, in addition, restrains a flow of hydraulic fluid of opposite the slow acceleration side direction flow from moving toward the inside of said lock-up space.

6. The lock-up mechanism-equipped torque converter according to claim 5, wherein said deceleration communication-hole and said slow acceleration communication-hole are provided on the inside of said turbine by being located in different passages of the plurality of passages partitioned and formed by turbine blades.

\* \* \* \* \*

UNITED STATES PATENT AND TRADEMARK OFFICE
CERTIFICATE OF CORRECTION

PATENT NO. : 6,357,569 B2
DATED : April 23, 2002
INVENTOR(S) : Acres

It is certified that error appears in the above-identified patent and that said Letters Patent is hereby corrected as shown below:

<u>Column 5,</u>
Line 17, "said signal identifying" should read -- said play signal identifying --.
Line 20, "executing a first prize" should read -- executing a prize --.
Line 22, "the accumulatedg value" should read -- the accumulated value --.

Signed and Sealed this

Twenty-seventh Day of April, 2004

JON W. DUDAS
*Acting Director of the United States Patent and Trademark Office*